(12) United States Patent
Nimmala et al.

(10) Patent No.: US 11,758,608 B2
(45) Date of Patent: Sep. 12, 2023

(54) MANAGING A PERSISTENT CONNECTION USING A NETWORK COMPONENT

(71) Applicant: Apple Inc., Cupertino, CA (US)

(72) Inventors: Srinivasan Nimmala, San Jose, CA (US); Cahya A. Masputra, San Jose, CA (US); Dawei Zhang, Saratoga, CA (US); Haijing Hu, Los Gatos, CA (US); Huarui Liang, Beijing (CN); Krisztian Kiss, Hayward, CA (US); Lakshmi N. Kavuri, San Jose, CA (US); Li Su, San Jose, CA (US); Longda Xing, San Jose, CA (US); Murtaza A. Shikari, Mountain View, CA (US); Rafael L. Rivera-Barreto, Miami, FL (US); Rohan C. Malthankar, San Jose, CA (US); Samy Touati, Pleasanton, CA (US); Sree Ram Kodali, San Jose, CA (US); Srirang A. Lovlekar, Fremont, CA (US); Teck Yang Lee, Cupertino, CA (US); Vijay Venkataraman, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/949,142

(22) Filed: Oct. 15, 2020

(65) Prior Publication Data

US 2021/0120619 A1 Apr. 22, 2021

(51) Int. Cl.
*H04W 4/00* (2018.01)
*H04W 76/25* (2018.01)
(Continued)

(52) U.S. Cl.
CPC ........... *H04W 76/25* (2018.02); *H04L 1/1812* (2013.01); *H04L 67/55* (2022.05)

(58) Field of Classification Search
CPC ... H04L 5/0055; H04L 1/1812; H04L 5/0062; H04L 29/08576; H04L 1/1816;
(Continued)

(56) References Cited

U.S. PATENT DOCUMENTS

2014/0226548 A1* 8/2014 Son ....................... H04W 76/25 370/311
2021/0120619 A1* 4/2021 Nimmala ............... H04W 76/25

FOREIGN PATENT DOCUMENTS

EP 1513321 A2 * 3/2005 ............. G06F 12/10
WO WO-0233936 A1 * 4/2002 ............. H04L 29/06

* cited by examiner

*Primary Examiner* — Thai D Hoang
(74) *Attorney, Agent, or Firm* — Fay Kaplun & Marcin, LLP (57) ABSTRACT

A network component communicating with a user equipment (UE) and a server. The network component receives a first packet from the UE, wherein the first packet indicates to the network component that the network component is to perform operations on behalf of the UE to maintain a persistent connection, receives a second packet from the server and determines whether to transmit a signal to the UE based on the second packet received from the server. A UE having a transceiver and a processor. The UE transmits a first packet to the network component, wherein the first packet indicates to the network component that the network component is to perform operations on behalf of the UE to maintain a persistent connection, identifies an out of service (OOS) event, receives registration information from the network component and registers with the server based on the registration information received from the network component.

20 Claims, 8 Drawing Sheets

(51) Int. Cl.
*H04L 1/1812* (2023.01)
*H04L 67/55* (2022.01)

(58) Field of Classification Search
CPC ... H04L 1/1819; H04L 1/1822; H04L 1/1825; H04L 67/55; H04L 1/1664; H04L 2001/0097; H04W 76/25
See application file for complete search history.

Prior Art

MANAGING A PERSISTENT CONNECTION USING A NETWORK COMPONENT

BACKGROUND

A user equipment (UE) may establish and maintain a persistent connection with a server via a network connection. For example, the UE may be configured to receive push notifications from the server via the persistent connection. To maintain the persistent connection, the UE may transmit a keep-alive (KA) message to the server. The KA message may indicate to the server that the connection between the UE and the server should be preserved for future communications.

Under conventional circumstances, the UE may periodically transmit KA messages to the server. From the perspective of the UE, the rate at which KA messages are transmitted has an effect on both performance and power. For instance, if a connectivity issue occurs between the UE and the server, the UE may not receive any push notifications from the server until after the UE transmits the next scheduled KA message. Thus, the larger the duration between the periodic transmission of the KA messages, the longer the UE may wait to receive the push notification. However, transmitting KA messages causes the UE to experience a power drain. Accordingly, when maintaining the persistent connection, the UE may have to sacrifice power for performance or vice versa.

The server may be configured to provide push notification to multiple UEs. From the network perspective, the KA messages and related traffic may increase the network load and consequently cause a degradation in network performance. Accordingly, maintaining a persistent connection between the UE and the network in the conventional manner is inefficient use of both UE and network resources.

SUMMARY

The exemplary embodiments include methods performed by a network component configured to communicate with a user equipment (UE) and a server. The methods include receiving a first packet from the UE, wherein the first packet indicates to the network component that the network component is to perform one or more operations on behalf of the UE to maintain a persistent connection with the server, receiving a second packet from the server and determining whether to transmit a signal to the UE based on the second packet received from the server.

Further exemplary embodiments include a network component having a communication interface configured to communicate with a user equipment (UE) and a server and executable instructions configured to cause the network component to perform operations. The operations include receiving a first packet from the UE, wherein the first packet indicates to the network component that the network component is to perform one or more operations on behalf of the UE to maintain a persistent connection with the server, receiving a second packet from the server and determining whether to transmit a signal to the UE based on the second packet received from the server.

Still further exemplary embodiments include a user equipment (UE) having a transceiver, configured to establish a persistent connection with a server and communicate with a network component, and a processor configured to perform operations. The operations include transmitting a first packet to the network component, wherein the first packet indicates to the network component that the network component is to perform one or more operations on behalf of the UE to maintain the persistent connection with the server, identifying an out of service (OOS) event, receiving, after the OOS event, registration information from the network component corresponding to the server and registering with the server based on the registration information received from the network component.

DETAILED DESCRIPTION

The exemplary embodiments may be further understood with reference to the following description and the related appended drawings, wherein like elements are provided with the same reference numerals. The exemplary embodiments describe devices, systems and methods for managing a persistent connection between a user equipment (UE) and a server. As will be described below, the exemplary embodiments relate to offloading various operations, that are conventionally performed by the UE, to a network component.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a push notification server. The push notification server may be configured to send push notifications to multiple UEs. However, reference to a push notification server and push notifications are merely provided for illustrative purposes and are not intended to limit the scope of the exemplary embodiments to only push notifications. The exemplary embodiments may apply to any network component that is configured to transmit any type of data to the UE.

The UE may establish a persistent connection with the push notification server. Push notifications may be provided to the UE by the push notification server via the persistent connection. Throughout this description the term "persistent connection" may refer to a communication channel between the UE and a server that is intended to be utilized for more than one message. From the UE perspective, messages may be received via the persistent connection regardless of the UE operating state (e.g., connected state, idle state, low-power state, full-power state, etc.). From the server perspective, the persistent connection is generally intended to remain open. However, reference to the term persistent connection is merely provided for illustrative purposes. Different networks and entitles may refer to similar concepts by a different name.

Under conventional circumstances, to maintain the persistent connection between the UE and the push notification server, the UE may transmit keep-alive (KA) messages to the push notification server. The KA messages indicate to the push notification server that the persistent connection is to be preserved for future communications. The KA messages may be transmitted periodically and/or triggered by a predetermined condition. In response to the KA message, the push notification server may transmit an acknowledgement (ACK) message to the UE. When the persistent connection is active, the push notification server may transmit a push notification to the UE.

The exemplary embodiments relate to offloading various operations, that are conventionally performed by the UE, to a network component. Throughout this description, this network component may be referred to as a persistent connection management offload function (PCMOF). The PCMOF may communicate with both the UE and the push notification server. As will be described in further detail below, once the persistent connection between the UE and the push notification server is established, the PCMOF may transmit KA messages to the push notification server on behalf of the UE. The PCMOF may also receive ACKs on behalf of the UE. Thus, the PCMOF allows the UE to maintain connectivity to the push notification server while avoiding the power cost associated with transmitting KA messages and receiving ACKs. Further, since the KA messages and the ACKs are not traveling between the UE and the push notification server, cellular traffic at the radio access network (RAN) level is reduced.

The exemplary embodiments describe various configurations and scenarios in which the PCMOF performs one or more operations on behalf of the UE. However, the exemplary embodiments are not limited to the scenarios and configurations described herein. This exemplary PCMOF may be used in conjunction with other currently implemented persistent connection management techniques, future implementations of persistent connection management techniques or independently from other persistent connection management techniques.

Figure 1:
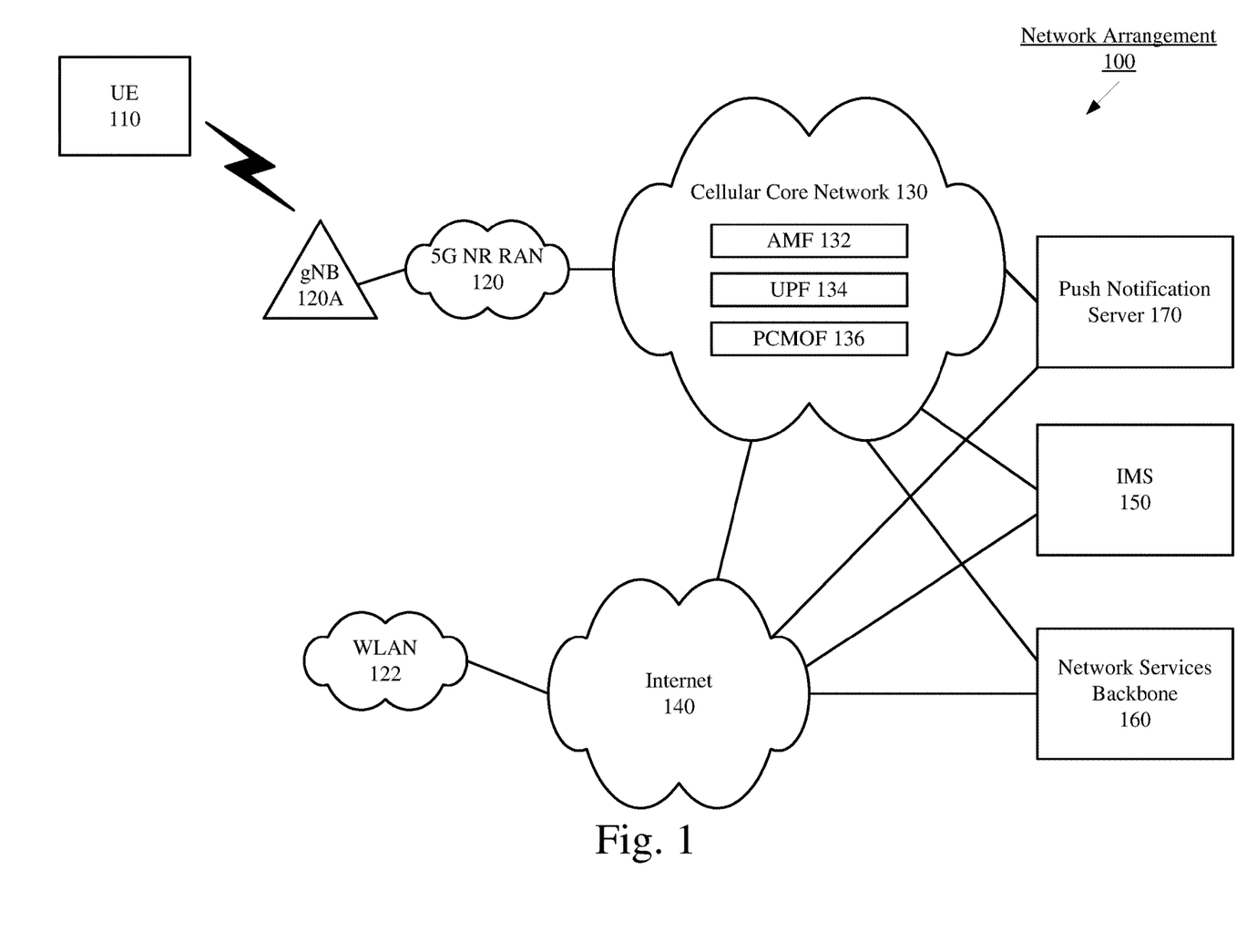
FIG. 1 shows an exemplary network arrangement according to various exemplary embodiments.

FIG. 1 shows a network arrangement 100 according to the exemplary embodiments. The network arrangement 100 includes the UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate directly with one or more networks. In the example of the network arrangement 100, the UE 110 may wirelessly communicate with a 5G new radio (NR) radio access network (5G NR RAN) 120 and a wireless local access network (WLAN) 122. However, the UE 110 may also communicate with other types of networks (e.g., an LTE RAN, a legacy RAN etc.). The UE 110 may also communicate with networks over a wired connection. Therefore, the UE 110 may include a 5G NR chipset to communicate with the 5G NR RAN 120 and an ISM chipset to communicate with the WLAN 124.

The 5G NR RAN 120 may be a portion of a cellular network that may be deployed by cellular providers (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a next generation Node B (gNB) 120A. Those skilled in the art will understand that any association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A of the 5G NR RAN 120). As mentioned above, the use of the 5G NR RAN 120 is for illustrative purposes and any type of network may be used. For example, the UE 110 may also connect to the LTE-RAN (not pictured) or the legacy RAN (not pictured).

In addition to the networks 120 and 122 the network arrangement 100 also includes a cellular core network 130. The cellular core network 130 may be considered to be the interconnected set of components that manages the operation and traffic of the cellular network. In this example, the components include an access and mobility management function (AMF) 132, the user plane function (UPF) 134 and the keep alive offload function (PCMOF) 136. However, an actual cellular core network may include various other components performing any of a variety of different functions.

The AMF 132 performs operations related to mobility management such as, but not limited to, paging, non-access stratum (NAS) management and registration procedure management between the UE 110 and the cellular core network 130. The UPF 134 performs operations such as, but not limited to, user traffic transport functions, IP address management for the UE 110 and provides a quality of service (QoS) enforcement function.

The PCMOF 136 may be configured to perform various operations on behalf of the UE 110 related to establishing and managing a persistent connection between the UE 110 and the push notification server 170. The PCMOF 136 may include a communication interface that allows the PCMOF 136 to communicate (directly or indirectly) with other network components within the cellular core network 130 and components outside of the cellular core network 130. The communication interface may also be capable of communicating with another component using an out of band communication channel. The out of band communication channel may be used to ensure that the PCMOF 136 may communicate with another component when a network issue or feature (e.g., firewall, filter, etc.) would otherwise prevent the PCMOF 136 from receiving incoming traffic or sending outgoing traffic. In some embodiments, the PCMOF 136 is encompassed within the UPF 134. However, any reference to the AMF 132, the UPF 134 and the PCMOF 136 are merely provided for illustrative purposes. Different networks may refer to components that perform similar functions by a different name.

The push notification server 170 is in communication either directly or indirectly with the Internet 140 and the cellular core network 130. The UE 110 may establish a persistent connection to the push notification server 170. The push notification server 170 may transmit push notifications to the UE 110 via the persistent connection. As mentioned above, the PCMOF 136 may be configured to perform various operations on behalf of the UE 110 and thus, the PCMOF 136 may communicate with both the UE 110 and the push notification server 170.

The network arrangement 100 also includes a cellular core network 130, the Internet 140, an IP Multimedia Subsystem (IMS) 150, and a network services backbone 160. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
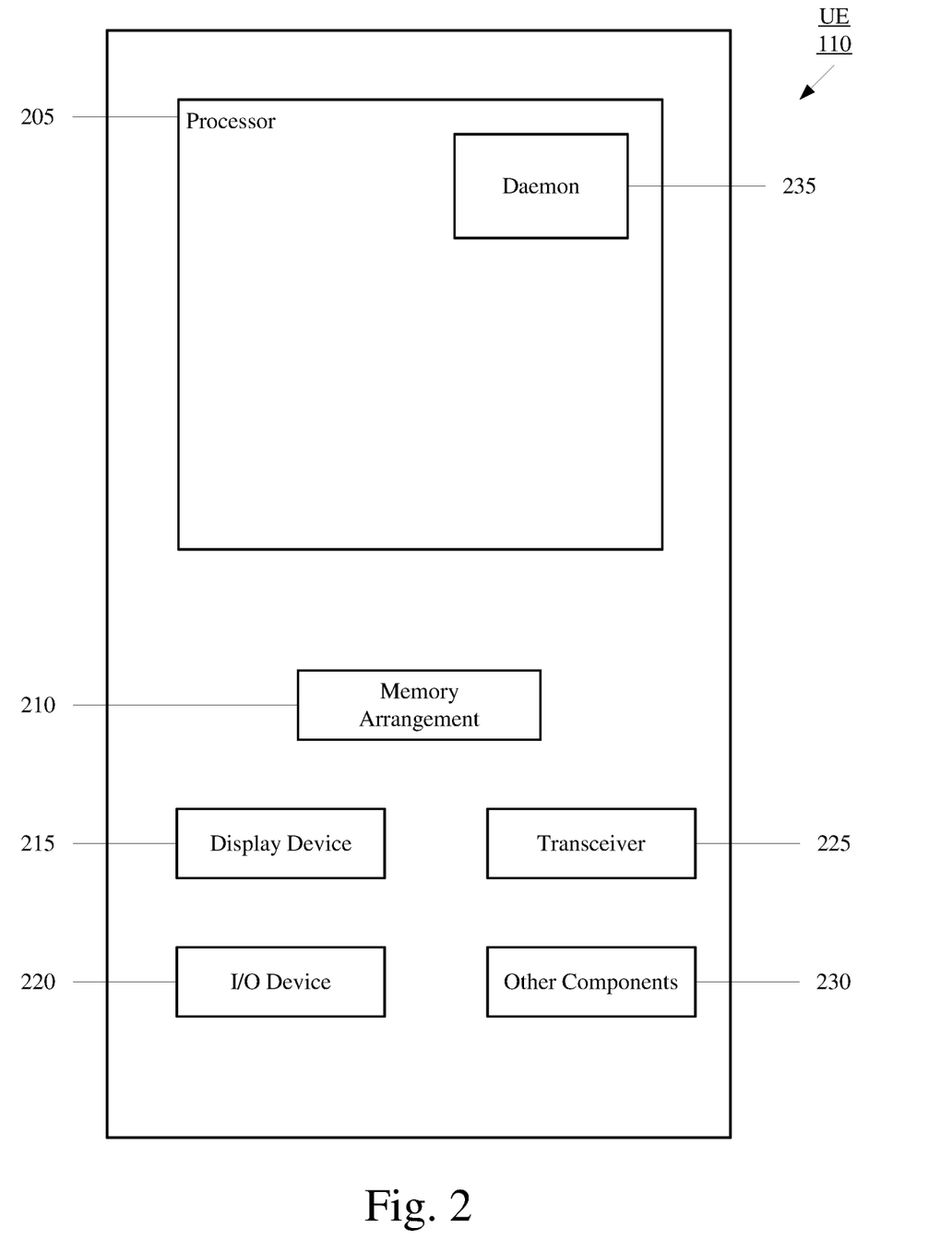
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a daemon 235. The daemon 235 may be executed as a background process and perform various operations related to managing push notification at the UE 110. The daemon 235 may manage push notifications on behalf of one or more applications.

The above referenced engine being executed by the processor 205 is only exemplary. The functionality associated with the daemon 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an application processor. The exemplary embodiments may be implemented in any of these or other configurations of a UE.

The memory 210 may be a hardware component configured to store data related to operations performed by the UE 110. As will be described in further detail below, the memory 210 may store data associated with the conditions of the UE 110 when a determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR RAN 120, the WLAN 122, etc. Accordingly, the transceiver 225 may operate on a variety of different frequencies or channels (e.g., set of consecutive frequencies).

Figure 3:
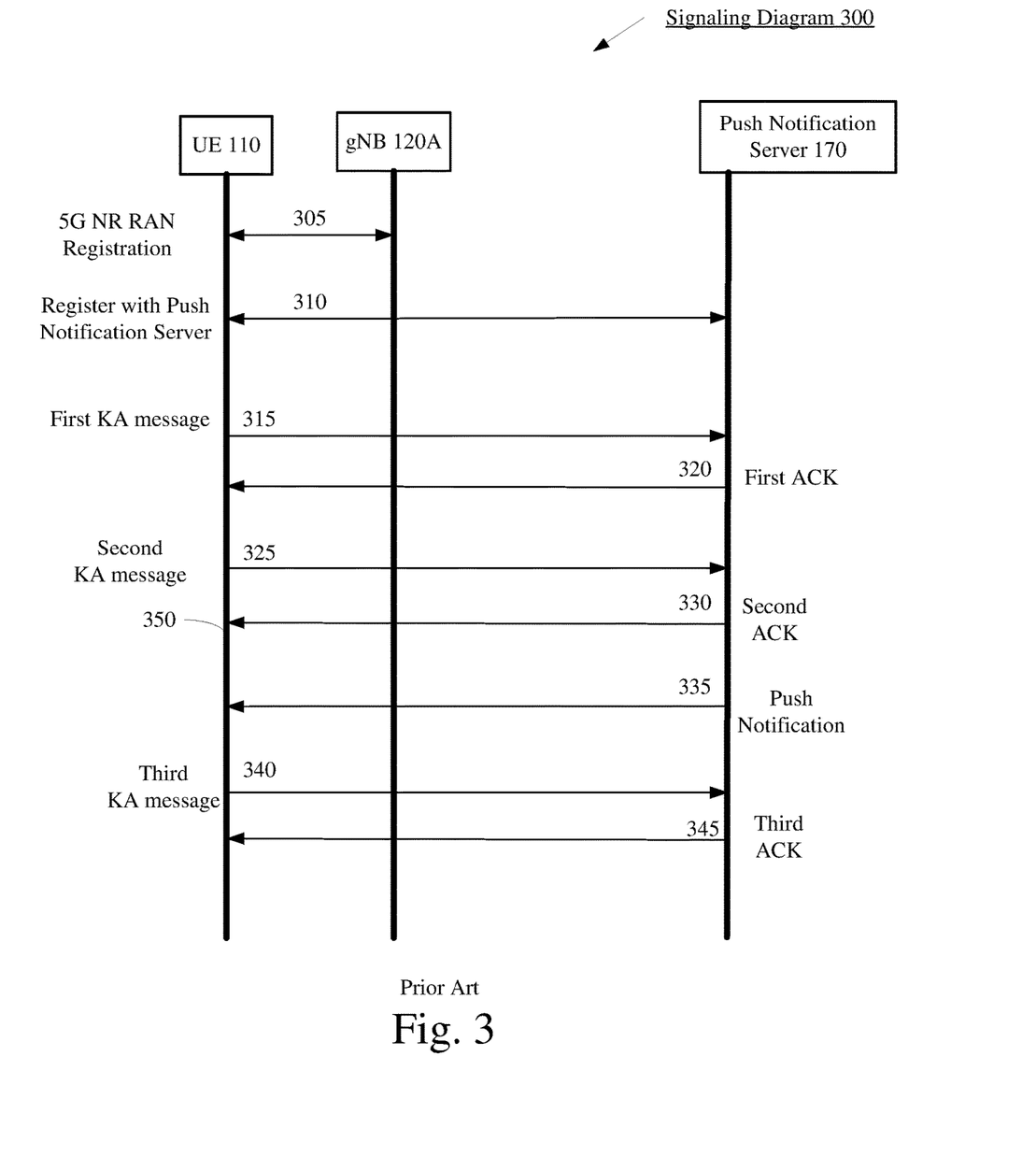
FIG. 3 shows a signaling diagram that relates to maintaining a persistent connection between the UE and the push notification server in the conventional manner.
Figure 4:
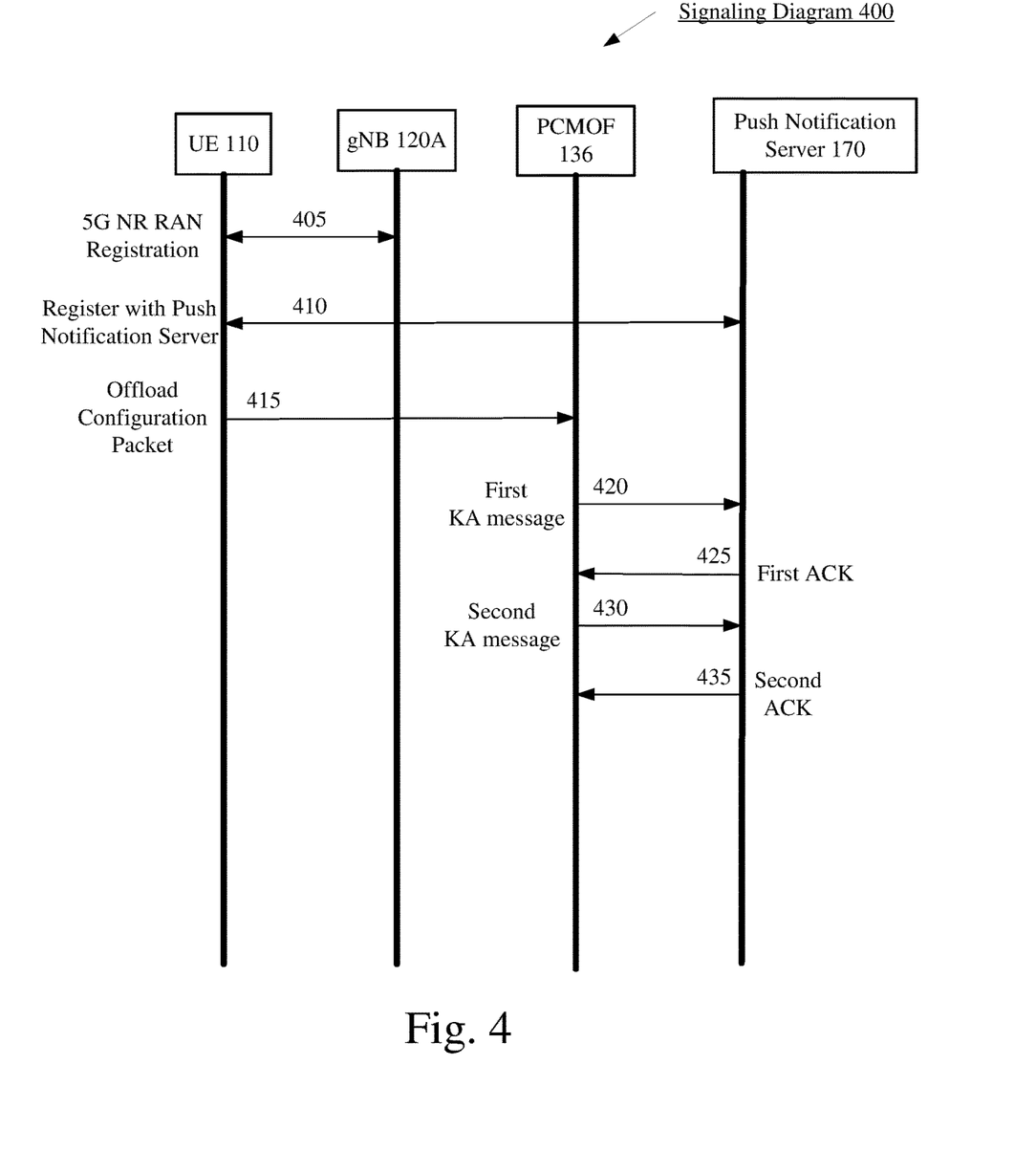
FIG. 4 shows a signaling diagram that relates to maintaining a persistent connection between the UE and the push notification server using the PCMOF according to various exemplary embodiments.

As mentioned above, the PCMOF 136 may perform various operations that are conventionally performed by the UE 110 when maintaining a persistent connection. To provide a general example of some of the types of operations that the PCMOF 136 may perform on behalf of the UE 110, the signaling diagrams 300 and 400 are provided below. The signaling diagram 300 of FIG. 3 provides an example of how the UE 110 may maintain a persistent connection with the push notification server 170 in the conventional manner (e.g., without using the PCMOF 136). The signaling diagram 400 of FIG. 4 provides an example of the PCMOF 136 performing an operation on behalf of the UE 110.

FIG. 3 shows a signaling diagram 300 that relates to maintaining a persistent connection between the UE 110 and the push notification server 170 in the conventional manner. The signaling diagram 300 will be described with regard to the UE 110 and the network arrangement 100. Consider the following exemplary scenario, the UE 110 is camped on the gNB 120A of the 5G NR RAN 120 and in an idle state.

In 305, the UE 110 and the gNB 120A participate in a signaling exchange to register the UE 110 with the 5G NR RAN 120. A person of ordinary skill in the art would understand that the registration process may include radio resource control (RRC) signaling to transition the UE 110 to the connected state. The registration process may also include various signaling between the UE 110, the gNB 120A and various network entities to establish various bearers and access to the full scope of services normally available to the UE 110 via the network connection.

In 310, the UE 110 and the push notification server 170 participate in a signaling exchange to register the UE 110 with the push notification server 170. This may include configuring the UE 110 with a socket at the push notification server 170 for services the UE is interested in (e.g., incoming IP based message notifications).

To ensure that the connection with the push notification server 170 remains active, the UE 110 may be configured to transmit periodic KA messages to the push notification server 170. If the push notification server 170 does not receive a KA message from the UE 110 for a predetermined amount of time, the push notification server 170 may assume that the UE 110 is unavailable and consequently, may close the socket and terminate the persistent connection.

In 315, the UE 110 transmits a first KA message to the push notification server 170. In 320, in response to the first KA message, the push notification server 170 may transmit a first ACK to the UE 110.

In 325, the UE 110 transmits a second KA message to the push notification server 170. In 330, in response to the second KA message, the push notification server 170 may transmit a second ACK to the UE 110. The interval between the first KA message and the second KA message may be based on a predetermined duration relative to the first KA message, a schedule, a predetermined condition or any combination thereof.

In 335, the push notification server 170 transmits a push notification to the UE 110. For example, the UE 110 may be configured to receive notifications regarding the user's social media account. The UE 110 (e.g., the daemon 235) may notify the user of the notification despite the corresponding application not being open. As mentioned above, the exemplary embodiments are not limited to push notifications and may apply to any type of data being transmitted to the UE 110 via a persistent connection.

In 340, the UE 110 transmits a third KA message to the push notification server 170. In 345, in response to the third KA message, the push notification server 170 may transmit a third ACK to the UE 110.

The exchange of periodic KA messages and ACKs may be repeated as long as the UE 110 is powered on and has a network connection. However, as mentioned above, the rate at which the KA messages are transmitted has an effect on power and performance. For instance, consider the following scenario in which a connectivity issue occurs between the UE 110 and the push notification server 170 after the UE 110 receives the second ACK. This connectivity issue is indicated by the point 350. In this scenario, the UE 110 may not receive the push notification transmitted in 335 until after the third KA message is transmitted in 340. Thus, a push notification is waiting to be received by the UE 110 from at least the point 350 until the third KA message is transmitted in 340. Accordingly, the longer the duration between KA messages, the longer the UE 110 may go without being able to receive push notifications from the push notification server 170. This can result in a poor user experience. However, the periodic transmission of KA messages and reception of ACKs causes the UE 110 to experience a power drain. Thus, when maintaining the persistent connection in the conventional manner, the UE 110 may have to sacrifice power for performance or vice versa.

FIG. 4 shows a signaling diagram 400 that relates to maintaining a persistent connection between the UE 110 and the push notification server 170 using the PCMOF 136 according to various exemplary embodiments. The signaling diagram 400 will be described with regard to the UE 110 and the network arrangement 100. Consider the following exemplary scenario in which the UE 110 is camped on the gNB 120A of the 5G NR RAN 120 and in an idle state.

In 405, the UE 110 and the gNB 120A participate in a signaling exchange to register the UE 110 with the 5G NR RAN 120. This is similar to the signaling exchange described above in 305 of the signaling diagram 300.

In 410, the UE 110 and the push notification server 170 participate in a signaling exchange to register the UE 110 with the push notification server 170. This is similar to the signaling exchange described above in 310 of the signaling diagram 300.

In 415, the UE 110 transmits an offload configuration packet to the PCMOF 136 that enables the PCMOF 136 to manage the periodic KA messages on behalf of the UE 110. How the UE 110 determines the availability of the PCMOF 136 and the contents of the offload configuration packet will be described in more detail below with regard to the method 500 of FIG. 5. The signaling diagram 400 is merely intended to provide a general example of the differences between using the PCMOF 136 to perform operations on behalf of the UE 110 and the conventional persistent connection management techniques shown in the signaling diagram 300.

In 420, the PCMOF 136 transmits a first KA message to the push notification server 170 on behalf of the UE 110. In 425, in response to the first KA message, the push notification server 170 may transmit a first ACK to the UE 110. However, the PCMOF 136 is configured to intercept transmissions to the UE 110 from the push notification server 170 and determine whether the transmission should be forwarded to the UE 110. In this example, since the transmission is an ACK the PCMOF 136 does not forward this transmission. As a result, the UE 110 is able to avoid the power drain of receiving and processing an ACK.

In 430, the PCMOF 136 transmits a second KA message to the push notification server 170 on behalf of the UE 110. In 435, in response to the second KA message, the push notification server 170 may transmit a second ACK to the UE 110. Like the first ACK, the transmission is intercepted by the PCMOF 136 and not forwarded to the UE 110. A comparison of the signaling diagram 300 and the signaling diagram 400 demonstrates that by using the PCMOF 136, the UE 110 is able to avoid the power cost of transmitting KA messages and receiving ACKs. An example of how the PCMOF 136 may handle a push notification is described below in the signaling diagram 600 of FIG. 6.

Figure 5:
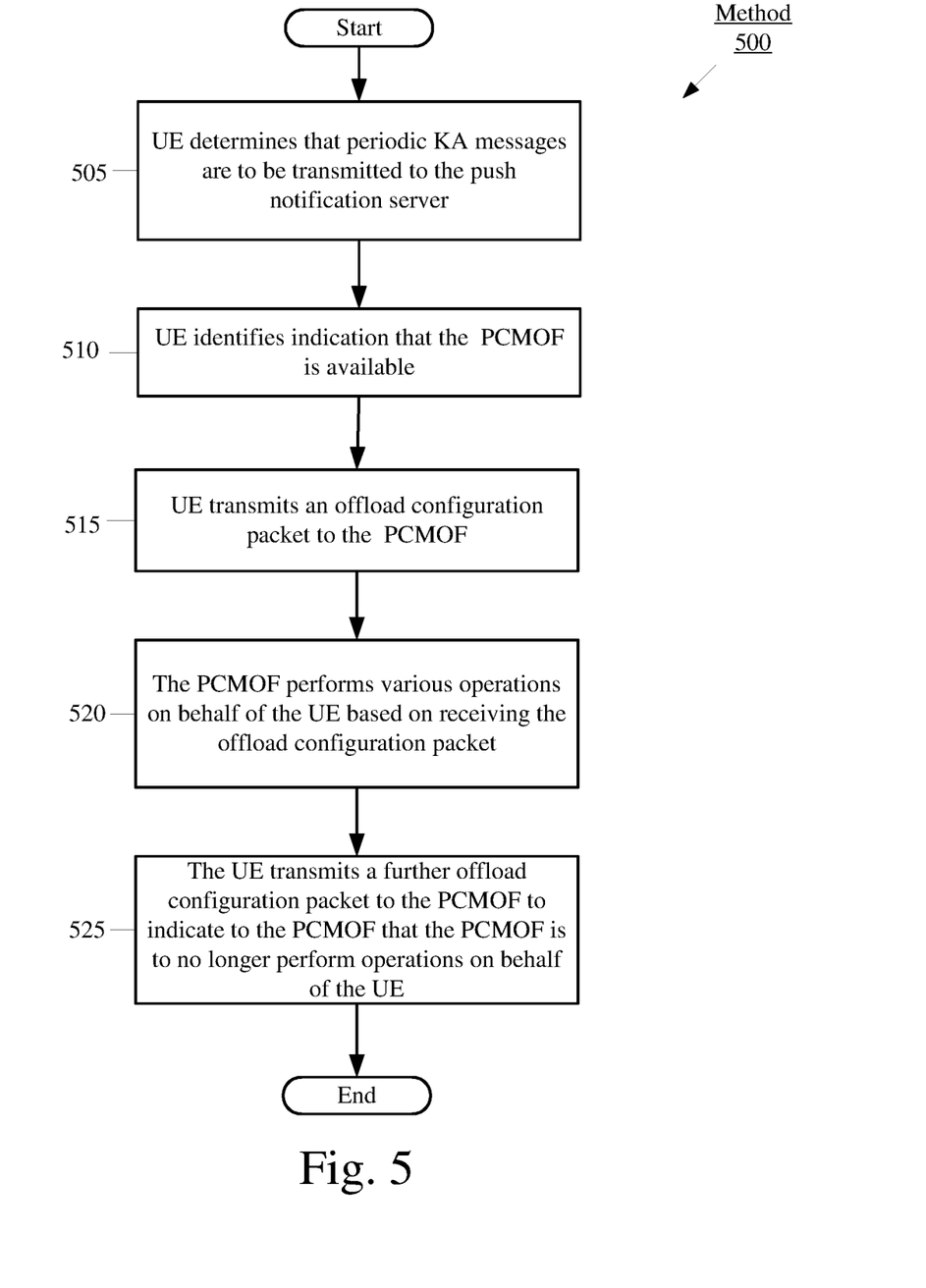
FIG. 5 shows an exemplary method for the UE to offload periodic KA messages to the PCMOF according various exemplary embodiments.

FIG. 5 shows an exemplary method 500 for the UE 110 to offload periodic KA messages to the PCMOF 136 according various exemplary embodiments. The method 500 will be described with regard to network arrangement 100 of FIG. 1 and the UE 110 of FIG. 2.

In 505, the UE 110 determines that periodic KA messages are to be transmitted to the push notification server 170. The UE 110 may make this determination based on identifying that the daemon 235 is launched and has completed registration with the push notification server 170.

In 510, the UE 110 identifies an indication that the PCMOF 136 is available. In addition to identifying that the PCMOF 136 is available, the UE 110 may also collect information that allows the UE 110 to contact the PCMOF 136. For example, the UE 110 may acquire one or more of the IPv4 address of the PCMOF 136, the IPv6 address of the PCMOF 136 or the port number to be used for communications with the PCMOF 136. It should be noted that PCMOFs may be specific to registration areas or public land mobile networks (PLMNs). Thus, during periods of mobility where the UE 110 moves across registration areas or PLMNs, the UE 110 may have to repeat this process.

The PCMOF 136 information may be received from any of a variety of different sources. For example, during network registration and/or protocol data unit (PDU) session establishment with the cellular core network 130, the UE 110 may receive an indication that the PCMOF 136 is available.

The PCMOF 136 information may also be received from a server within the control plane of the network. For example, the UE 110 may be configured to communicate with various network components within the control plane of the network. The UE 110 may send a request to a particular server for information regarding any available PCMOFs. In response, the UE 110 may receive the PCMOF 136 information from the server.

The PCMOF 136 information may also be received from a server within the user plane of the network. For example, the UE 110 may be configured to communicate with various network components within the user plane of the network. The UE 110 may send an internet protocol (IP) packet to a particular server requesting information regarding any available PCMOFs. In response, the UE 110 may receive the PCMOF 136 information from the server.

The PCMOF 136 information may also be included in a carrier bundle. The carrier bundle is one or more files that may be stored in the memory arrangement 210 of the UE 110 and contain settings specific to a particular carrier. Thus, the UE 110 may reference the stored carrier bundle to retrieve the PCMOF 136 information. However, reference to the carrier bundle is only for illustrative purposes, different entities may refer to a similar concept by a different name. The exemplary embodiments may apply to any type of information stored on the UE 110.

In 515, the UE 110 transmits the offload configuration packet to the PCMOF 136 based on the PCMOF 136 information received in 510. The offload configuration packet may be a user datagram protocol (UDP) packet, a transmission control protocol (TCP) packet or a packet that is in accordance with any other appropriate protocol.

The offload configuration packet may include a variety of different types of information and/or data. The PCMOF 136 may use the contents of the offload configuration packet to generate KA messages and initiate periodic KA messages with one or more servers on behalf of the UE 110.

The contents may include an enable/disable indication that indicates to the PCMOF 136 whether the PCMOF 136 is to perform KA messages on behalf of the UE 110. The contents may also include an indication of a KA message interval which is a duration of time (e.g., 1 minute, 3 minutes, 5 minutes, 10 minutes, 20 minutes, etc.) that is to occur between scheduled KA messages. The contents may also include information related to the basis on which the PCMOF 136 may declare a failure with regard to a KA message, e.g., the duration in which to wait for an ACK in response to a KA message before performing a retransmission or declaring a failure, a number of retransmissions to be performed before declaring a failure, etc. The contents may further include signaling information such as, but not limited to, the IPv4 address of the push notification server 170, the IPv6 address of the push notification server 170, the relevant port numbers of the push notification server 170, the IPv4 address of the UE 110, the IPv6 address of the UE 110, the relevant port numbers for the UE 110, the transport layer protocol to be used (e.g., UDP, TCP, etc.), the sequence number of the UE 110 and the sequence number for the push notification server 170.

In 520, the PCMOF 136 performs various operations on behalf of the UE 110 based on receiving the offload configuration packet. The operations may include, but are not limited to, transmitting periodic KA messages to the push notification server 170, receiving ACKS from the push notification server 170, receiving push notification from the push notification server 170, forwarding push notifications to the UE 110, indicating to the push notification server 170 that the UE 110 is unavailable, indicating to the push notification server 170 why the UE 110 is temporarily unavailable, etc.

In 525, the UE 110 may send a further offload configuration packet to the PCMOF 136. The further offload configuration packet may indicate to the PCMOF 136 that the PCMOF 136 is to no longer perform operations on behalf of the UE 110. The UE 110 may be triggered to send the further offload configuration packet to the PCMOF 136 for any appropriate reason. For example, user input may be received at the UE 110 indicating that the user no longer wants to receive a particular type of push notification.

Figure 6:
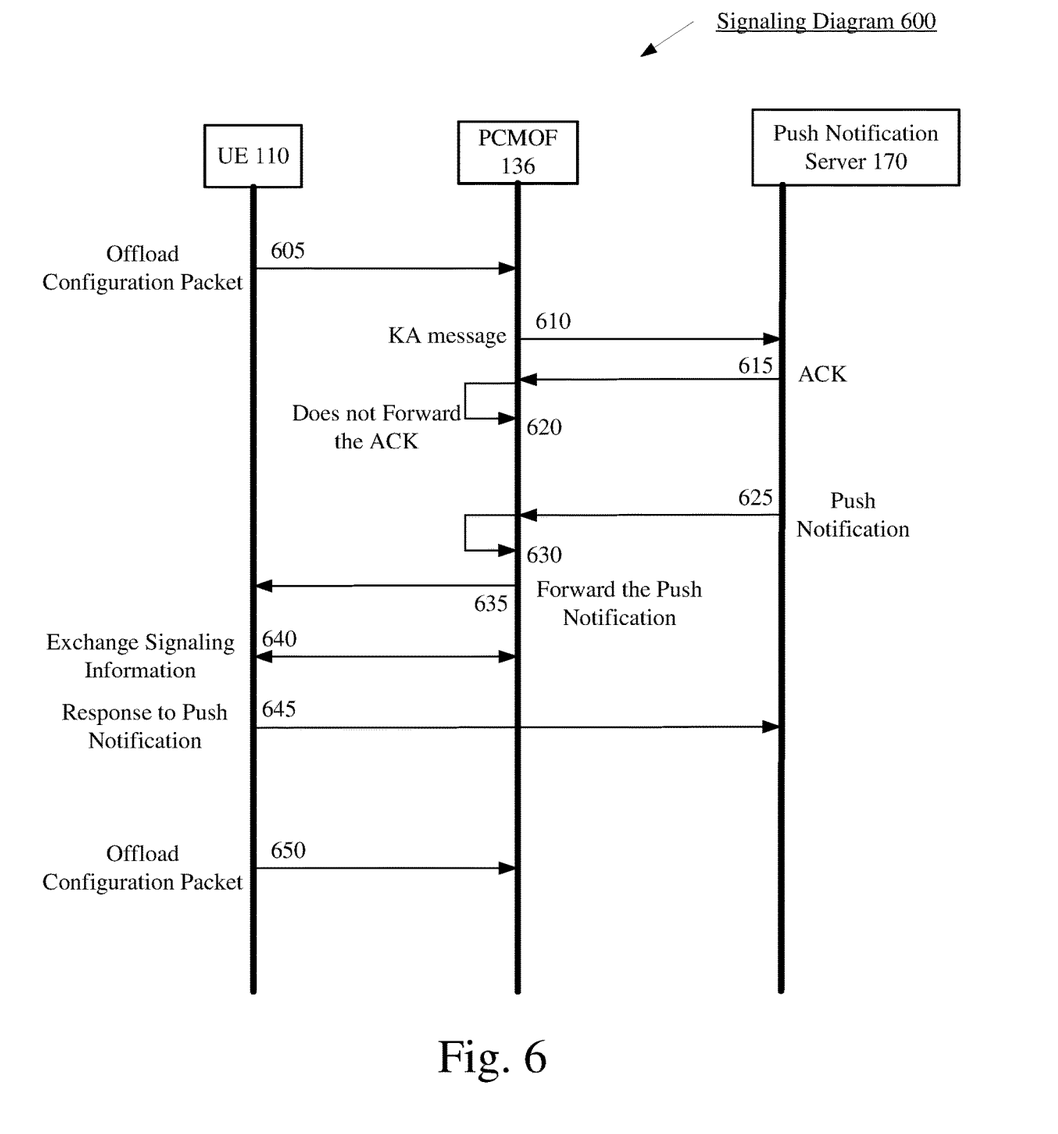
FIG. 6 shows a signaling diagram that relates to an incoming push notification according to various exemplary embodiments.

FIG. 6 shows a signaling diagram 600 that relates to an incoming push notification according to various exemplary embodiments. The signaling diagram 600 will be described with regard to the UE 110 and the network arrangement 100.

Consider the following exemplary scenario, the UE 110 has already registered with the push notification server 170. Further, the UE 110 has determined that the PCMOF 136 is available.

In 605, the UE 110 transmits the offload configuration packet to PCMOF 136. As mentioned above, the offload configuration packet may indicate to the PCMOF 136 that the PCMOF 136 is to perform various operations on behalf of the UE 110.

In 610, the PCMOF 136 transmits a KA message to the push notification server 170 on behalf of the UE 110. In 615, in response to the KA message, the push notification server 170 transmits an ACK to the UE 110.

For any of a variety of different reasons, the push notification server 170 may not respond to a KA message. If the PCMOF 136 determines that an ACK is not received within a predetermined amount of time and/or the PCMOF 136 has performed a predetermined number of retransmissions, the PCMOF 136 may instruct the UE 110 to re-register with the push notification server 170 to minimize the duration in which the UE 110 may be unable to receive push notifications from the push notification server 170.

Returning to the signaling diagram 600, in 620, the PCMOF 136 intercepts the ACK transmitted by the push notification server 170. The PCMOF 136 may be configured to intercept any packet transmitted to the UE 110 by the push notification server 170. Subsequently, the PCMOF 136 processes the contents of the packet and determines whether the packet is to be forwarded to the UE 110. In this example, the PCMOF 136 identifies that the packet is an ACK and thus, does not forward the packet to the UE 110.

In certain scenarios, the PCMOF 136 may receive an ACK from the push notification server 170 in response to a KA message that triggers the PCMOF 136 to contact the UE 110. For instance, in accordance with TCP protocol, any differences between the local host's sequence number and the remote host's ACK number may indicate that there is outstanding unacknowledged data. In this example, the PCMOF 136 would be the local host and the push notification server 170 would be the remote host. In one scenario, the difference in the sequence number and the ACK number may be based on the PCMOF 136 being unaware of data the UE 110 has sent to the push notification server 170. Thus, the PCMOF 136 may send the UE 110 an indication that the sequence number and the ACK number are out of sync. In response, the UE 110 may send a packet to the PCMOF 136 with latest signaling information to ensure that subsequent KA messages are in sync. In another scenario, the difference in the sequence number and the ACK number may be based on the push notification server 170 having an invalid TCP state for the socket of the UE 110. Thus, the PCMOF 136 may send the UE 110 an indication that the sequence number and the ACK number are out of sync. In response, the UE 110 may reset the TCP connection by re-registering with the push notification server 170.

Another scenario in which the PCMOF 136 may forward an ACK is when the incoming ACK has a sequence number that is greater than the remote sequence number. The change in sequence number may be based on data payload included within the ACK packet. For example, payload may be included when the ACK packet also includes payload data for a notification. Thus, the PCMOF 136 may forward the ACK to the UE 110 when the PCMOF 136 determines that the sequence numbers are not in sync.

Returning to the signaling diagram 600, in 625, the push notification server 170 transmits a push notification to the UE 110. In 630, the PCMOF 136 intercepts the push notification transmitted by the push notification server 170. In this example, the PCMOF 136 identifies that the packet is a push notification and thus, the PCMOF 136 is to forward the packet to the UE 110. The PCMOF 136 may differentiate between ACKs and push notifications based on the payload of the packet because an ACK may not include any payload data. In 635, the PCMOF 136 forwards the push notification to the UE 110.

As mentioned above, the PCMOF 136 may be configured to intercept any packet transmitted to the UE 110 by the push notification server 170. In some embodiments, the PCMOF 136 may determine whether to forward a packet based on, at least in part, the TCP flag included in the packet. For example, if the TCP flag is set to only an ACK value, this may indicate to the PCMOF 136 that the packet may not be forwarded to the UE 110. If the TCP flag includes any other value (with or without the ACK value), the packet may be forwarded to the UE 110. Other TCP flag values include, but are not limited to, push (PSH), urgent (URG), reset (RST), finished (FIN), explicit congestion notification (ECN) and congestion window reduced (CWR). A person of ordinary skill in the art would understand that these flags are intended to indicate to the receiving device.

Returning to the signaling diagram 600, in 640, the UE 110 and the PCMOF 136 participate in a signaling exchange. This signaling exchange provides the UE 110 with various signaling information (e.g., latest local and remote sequence number) and indicates to the PCMOF 136 that the PCMOF 136 is to no longer perform operations on behalf of the UE 110. In some embodiments, the UE 110 may fetch the signaling information needed from the PCMOF 136 to respond to the push notification. In other embodiments, the PCMOF 136 may proactively send the UE 110 the signaling information needed for the UE 110 to response to the push notification.

In 645, the UE 110 transmits a response to the push notification server 170. The response may be based, in part, on the signaling information received by the UE 110 in the signaling exchange of 640.

In 650, the UE 110 transmits the offload configuration packet to PCMOF 136. Accordingly, the PCMOF 136 resumes performing various operations on behalf of the UE 110.

There may be scenarios in which the push notification server 170 is unable to reach the UE 110. For example, the UE 110 may experience an out of service (00S) event and be unable to receive any data via the cellular connection. In another example, for any of a variety of different reasons, a carrier firewall or network component (e.g., network address translation (NAT) gateway) may drop an incoming push notification before it reaches the UE 110. When the UE 110 and the push notification server 170 are unable to communicate, the persistent connection may timeout and the socket may be torn down. To minimize the duration in which the UE 110 is not connected to the push notification server 170, the push notification server 170 may be configured to inform the PCMOF 136 about the connectivity issue with the UE 110. In response, the PCMOF 136 may be configured to perform various operations to re-register the UE 110 with the push notification server 170.

Figure 7:
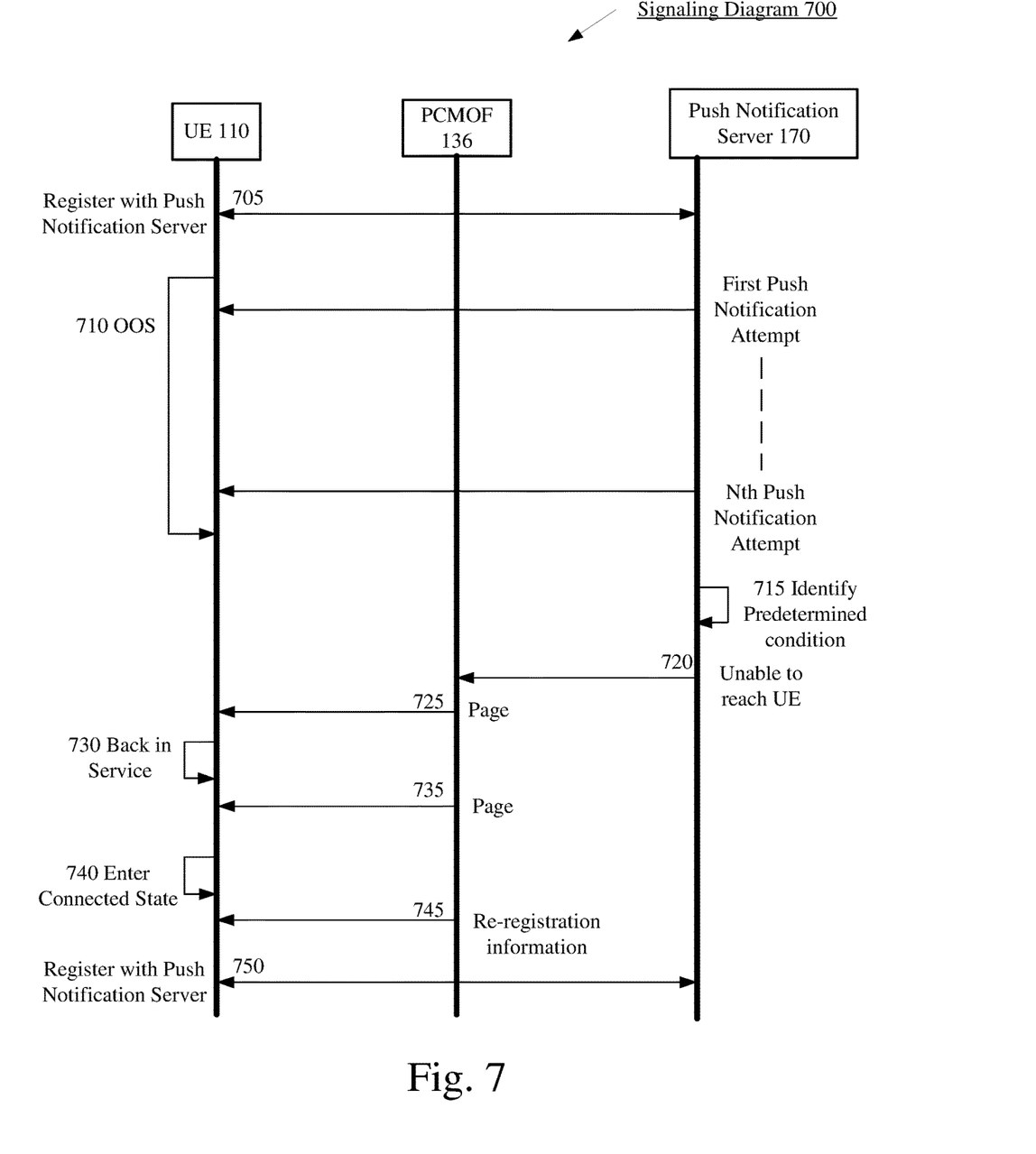
FIG. 7 shows a signaling diagram that relates to opportunistic re-registration of the UE with the push notification server according to various exemplary embodiments.

FIG. 7 shows a signaling diagram 700 that relates to opportunistic re-registration of the UE 110 with the push notification server 170 according to various exemplary embodiments. The signaling diagram 700 will be described with regard to the UE 110 of FIG. 2 and the network arrangement 100 of FIG. 1.

Under conventional circumstances, the UE 110 may initiate re-registration with the push notification server 170 in response to an OOS event. However, if the push notification server 170 does not tear down the persistent connection while the UE 110 is OOS, performing re-registration is unnecessary and a waste of resources because the push notification server 170 still has the UE 110 context.

As will be demonstrated below, the PCMOF 136 may be configured to trigger the UE 110 to initiate re-registration with the push notification server 170. Thus, the UE 110 may rely on the PCMOF 136 to trigger the UE 110 to initiate re-registration when the UE 110 context is lost. As a result, the UE 110 may only initiate re-registration when UE 110 context is lost and avoid the power cost of performing re-registration when the push notification server 170 still has the UE 110 context.

In 705, the UE 110 and the push notification server 170 participate in a signaling exchange to register the UE 110 with the push notification server 170. In some embodiments, this signaling exchange may include an indication to the server that the UE 110 supports PCMOF functionality. In other embodiments, the push notification server 170 may be informed about the use of the PCMOF 136 based on an indicator in the KA messages sent from the PCMOF 136 to the push notification server 170 on behalf of the UE 110. As will be shown below, since the use of the PCMOF 136 by the UE 110 is known to the push notification server 170, the push notification server 170 may inform the PCMOF 136 when the UE 110 is unavailable (e.g., the UE 110 is OOS, the UE 110 is in service but a communication issue is preventing the UE 110 from receiving the push notification, etc.). As a result, the PCMOF 136 can implement various techniques to trigger the UE 110 to re-register with the push notification server 170.

In 710, the UE 110 experiences a connectivity issue and is OOS for (X) minutes (e.g., 1 minute, 3 minutes, 5 minutes, 10 minutes, 15 minutes, 30 minutes, etc.). While the UE 110 is OOS, the push notification server attempts to deliver a push notification to the UE 110 (N) times. As shown in the signaling diagram 600, this may include the PCMOF 136 intercepting the push notification and forwarding the push notifications to the UE 110. In this example, each of the first through N push notifications do not reach the UE 110 because the UE 110 is OOS. Consequently, the push notification server 170 does not receive a response from the UE 110.

In 715, the push notification server 170 identifies a predetermined condition related to being unable to deliver the push notification to the UE 110. In some embodiments, identifying this predetermined condition may trigger the push notification server 170 to tear down the UE 110 socket locally. The predetermined condition may be based on not receiving a response to a push notification for a predetermined amount of time, transmitting the push notification a predetermined amount of times or a combination thereof.

In 720, the push notification server 170 transmits a message to the PCMOF 136 that indicates to the PCMOF 136 that the push notification server 170 has been unable to reach the UE 110. In response to this indication, the PCMOF 136 periodically pages the UE 110. For example, the PCMOF 136 may indirectly page the UE 110 by communicating with another network component or the PCMOF 136 may ping the UE 110. In 725, the PCMOF 136 transmits a page to the UE 110. However, in this example, the UE 110 is still out of service and thus, does not receive the page.

In 730, the UE 110 is back in service. In 735, the PCMOF 136 transmits another page to the UE 110. Since the UE 110 is back in service, the UE 110 receives this page. In 740, the UE 110 may enter a connected state. In some embodiments, the UE 110 is triggered to enter the connected state based on the second page. In other embodiments, the UE 110 may be triggered to transition to the connected state autonomously due to mobile originating (MO) traffic or mobile terminating (MT) traffic. To ensure that the PCMOF 136 is aware of the UE 110 transition to the connected state, the AMF 132 may be configured to inform the PCMOF 136 about the UE 110 transition to the connected state. However, in other embodiments, either the UE 110 and/or any appropriate network component may inform the PCMOF 136 that the UE 110 is in the connected state.

The AMF 132 may also communicate with the PCMOF 136 for other reasons. For example, the AMF 132 may inform the PCMOF 136 when the UE 110 is not available (e.g., detached, OOS, tracking area update (TAU) failure, etc.). In response, the PCMOF 136 may stop transmitting KAs on behalf of the UE 110.

Returning to the signaling diagram 700, in 745, the PCMOF 136 transmits a re-registration information message to the UE 110. The re-registration information may include an indication of the IP address and port details to which to re-establish sockets with the push notification server 170.

In 750, UE 110 and push notification server 170 participate in a signaling exchange to re-register the UE 110 with the push notification server 170. The re-registration process utilizes the contents of the re-registration information message received in 745. Subsequently, the push notification server 170 provides the UE 110 with the push notification that the push notification server 170 was previously unable to deliver to the UE 110.

Figure 8:
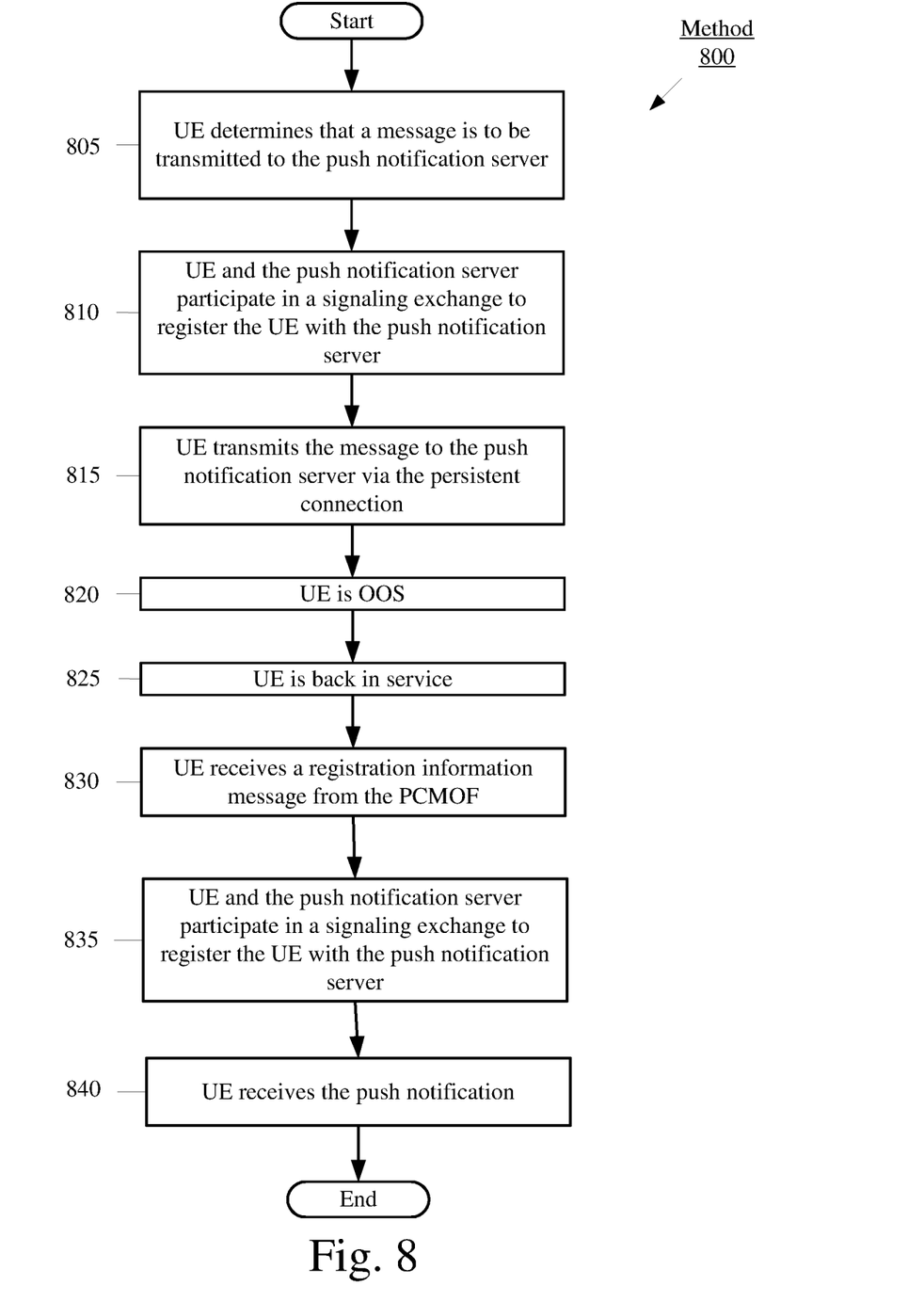
FIG. 8 shows an exemplary method for a UE that is configured to infrequently communicate with the push notification server.

FIG. 8 shows an exemplary method 800 for a UE 110 that is configured to infrequently communicate with the push notification server 170. The method 800 will be described with regard to network arrangement 100 of FIG. 1 and the UE 110 of FIG. 2.

Certain types of UEs do not typically transmit messages to the push notification server 170 or receive push notification messages. Thus, configuring the PCMOF 136 to transmit periodic KA messages on behalf of this type of UE is an inefficient use of resources. Accordingly, the method 800 relates to utilizing the PCMOF 136 to perform operations on behalf of the UE 110. However, these operations do not include periodic KA messages.

In 805, the UE 110 determines that a message is to be transmitted to the push notification server 170. As mentioned above, this is not typically performed by this UE 110. Accordingly, there is not an active persistent connection at this time.

In 810, the UE 110 and the push notification server 170 participate in a signaling exchange to register the UE 110 with the push notification server 170. Since communicating with the push notification server 170 is rare for this type of UE 110, participating in the registration process for every outgoing message is a more efficient use of resources than having the PCMOF 136 maintain a persistent connection between the UE 110 and the push notification server 170. In 815, the message is sent to the push notification server 170 via the persistent connection.

In 820, the UE 110 is OOS. While the UE 110 is OOS, the push notification server 170 attempts to deliver a push notification to the UE 110 multiple times. Since the UE 110 is OOS, the push notification server 170 does not receive any responses from the UE 110. Thus, the push notification server 170 determines that the UE 110 is unavailable and the push notification server 170 tears down the UE 110 connection locally. Subsequently, the push notification server 170 transmits a message to the PCMOF 136 that indicates to the PCMOF 136 that the push notification server 170 has been unable to deliver a push notification to the UE 110. In response to this indication, the PCMOF 136 periodically pages the UE 110. The operations performed by the push notification server 170 and the PCMOF 136 while the UE 110 is OOS in 820 is substantially similar to the events depicted in 710-725 of the signaling diagram 700.

The exemplary embodiments are not limited to scenarios in which the UE 110 is OOS. For example, there may be a scenario where the UE 110 is in service and/or in the connected state but the push notification server 170 in unable to reach the UE 110 because the push notification server 170 does not have the UE 110 context. Thus, reference to the UE 110 being OOS is only for illustrative purposes and the exemplary embodiments may apply to any scenario in which push notification server 170 is unable to reach the UE 110.

In 825, the UE 110 is back in service and transitions to the connected state. In 830, the UE 110 receives a registration information message from the PCMOF 136 that includes an indication of the IP address and port details to which to establish sockets with the push notification server 170.

In 835, the UE 110 and the push notification server 170 participate in a signaling exchange to re-register the UE 110 with the push notification server 170. The re-registration process utilizes the contents of the re-registration information message received in 830.

In 840, the push notification server 170 provides the UE 110 with the push notification that the push notification server 170 was previously unable to deliver. 825-840 are substantially similar to the events depicted in 730-750 of the signaling diagram 700.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:

at a network component configured to communicate with a user equipment (UE) and a server:

receiving a first packet from the UE, wherein the first packet indicates to the network component that the network component is to perform one or more operations on behalf of the UE during an offload period to maintain a persistent connection between the server and the UE;

transmitting, on behalf of the UE, a second packet to the server during the offload period, the second packet comprising a Keep Alive (KA) message configured to maintain the persistent connection; and receiving, on behalf of the UE, an Acknowledgement (ACK) message from the server during the offload period.

2. The method of claim 1, further comprising:
receiving a third packet from the server;
determining whether the third packet includes payload data intended for the UE;
when the third packet includes the payload data intended for the UE, transmitting a signal to the UE, wherein the signal includes the third packet.

3. The method of claim 2, wherein the third packet includes a push notification intended for the UE.

4. The method of claim 2, further comprising:
when the third packet does not include the payload data intended for the UE, determining a flag value included in the third packet.

5. The method of claim 4, further comprising:
when the flag value indicates that the third packet includes only an acknowledgement (ACK) to a message transmitted to the server by the network component on behalf of the UE, the signal is not transmitted to the UE.

6. The method of claim 4, further comprising:
when the flag value indicates that the third packet includes only an acknowledgement (ACK) to a message transmitted to the server by the network component on behalf of the UE, determining whether to transmit the signal to the UE based on i) one or more sequence numbers associated with the third packet or ii) an acknowledgement number associated with the second packet;
transmitting the signal to the UE based on i) the one or more sequence numbers associated with the third packet or ii) the acknowledgement number associated with the third packet, wherein the signal includes the third packet.

7. The method of claim 1, further comprising:
determining that the third packet indicates that the UE has not received one or more packets transmitted by the server that were intended for the UE; and
transmitting the signal to the UE, wherein the signal includes information that is to be utilized by the UE to register with the server.

8. The method of claim 7, further comprising:
receiving, after the third packet, an indication that the UE has transitioned to a connected state,
wherein the signal is transmitted to the UE based on the indication that the UE has transitioned to the connected state.

9. The method of claim 8, wherein the indication that the UE has transitioned to the connected state is received from a further network component.

10. The method of claim 9, wherein the further network component is an access and mobility management function (AMF) of a cellular core network.

11. The method of claim 1 further comprising:
receiving a third packet from the UE, wherein the third packet indicates to the network component that the network component is to no longer perform the one or more operations on behalf of the UE.

12. The method of claim 1, wherein the one or more operations include periodically transmitting keep-alive (KA) messages to the server on behalf of the UE, wherein the KA messages indicate to the server that the persistent connection between the UE and the server is to remain open for future communications with the UE.

13. The method of claim 12, further comprising:
receiving an indication that the UE is not available wherein the network component stops periodically transmitting KA messages to the server on behalf of the UE based on the indication that the UE is unavailable.

14. A network component, comprising:
a communication interface configured to communicate with a user equipment (UE) and a server; and
executable instructions configured to cause the network component to perform operations, the operations comprising:
receiving a first packet from the UE, wherein the first packet indicates to the network component that the network component is to perform one or more operations on behalf of the UE during an offload period to maintain a persistent connection between the server and the UE;
transmitting, on behalf of the UE, a second packet to the server during the offload period, the second packet further comprising a Keep Alive (KA) message configured to maintain the persistent connection;
receiving, on behalf of the UE, an Acknowledgement (ACK) message from the server during the offload period, wherein the ACK message is not transmitted through the RAN.

15. The network component of claim 14, the operations further comprising:
receiving a third packet from the server;
determining whether the third packet includes payload data intended for the UE;
when the third packet includes the payload data intended for the UE, transmitting signal to the UE, wherein the signal includes the third packet.

16. The network component of claim 14, the operations further comprising:
determining that the third packet indicates that the UE has not received one or more packets transmitted by the server that were intended for the UE; and
transmitting the signal to the UE, wherein the signal includes information that is to be utilized by the UE to register with the server.

17. A user equipment (UE), comprising:
a transceiver, configured to establish a persistent connection with a push notification server and communicate with a network component; and
a processor configured to perform operations, comprising:
establishing the persistent connection with the push notification server;
transmitting a first packet to the network component, wherein the first packet indicates to the network component that the network component is to perform one or more operations on behalf of the UE to maintain the persistent connection with the push notification server during an offload period;
identifying an out of service (OOS) event;
receiving, after the OOS event, registration information generated by the network component configured to trigger the UE to re-establish the persistent connection with the push notification server; and registering with the push notification server using the registration information from the network component to re-establish the persistent connection between the UE and the push notification server.

18. The UE of claim 17, wherein the first packet includes one or more of an IPv4 address for the push notification server, an IPv6 address for the push notification server, one or more port numbers for the push notification server, an IPv4 address for the UE, an IPv6 address for the UE, one or more port numbers for the UE, and one or more sequence numbers.

19. The UE of claim 17, wherein the registration information includes an internet protocol (IP) address and one or more port numbers for the push notification server.

20. The UE of claim 17, the operations further comprising:
determining that the network component is available to be used to perform the one or more operations on behalf of the UE to maintain the persistent connection with the push notification server based on information received from the network,
wherein the first packet is transmitted to the network component based on determining that the network component is available.

* * * * *